United States Patent [19]

Sakakibara et al.

[11] 4,057,712
[45] Nov. 8, 1977

[54] METHOD AND APPARATUS FOR DISPLAYING BRAKE STOPPING DISTANCE OF A VEHICLE

[75] Inventors: Yasuyuki Sakakibara, Okazaki; Akira Kuno, Nagoya, both of Japan

[73] Assignee: Nippon Soken, Inc., Nishio, Japan

[21] Appl. No.: 708,083

[22] Filed: July 23, 1976

[30] Foreign Application Priority Data

Sept. 23, 1975  Japan ............................. 50-115213

[51] Int. Cl.² .................... B60Q 1/00; G06G 7/78
[52] U.S. Cl. ...................... 364/426.2; 73/490; 180/105 E; 340/104; 364/561
[58] Field of Search .......... 235/151.32, 150.2, 150.24, 235/150.27; 340/22, 34, 62, 104; 180/98, 105 R, 105 E, 106; 116/28 R, 35 R, 37, 57, 114 W, 116; 73/490

[56] References Cited

U.S. PATENT DOCUMENTS

| | | | |
|---|---|---|---|
| 3,469,234 | 9/1969 | Greacen | 340/104 |
| 3,841,427 | 10/1974 | Di Vita | 180/98 |
| 3,850,041 | 11/1974 | Seaman | 340/104 X |
| 3,868,629 | 2/1975 | Caine | 340/104 |
| 3,949,362 | 4/1976 | Doyle et al. | 340/104 |

*Primary Examiner*—Joseph F. Ruggiero
*Attorney, Agent, or Firm*—Cushman, Darby & Cushman

[57] ABSTRACT

A method and apparatus for displaying the brake stopping distance of a running vehicle by computing and displaying in a very short period of time the brake stopping distance of the running vehicle in response to its running speed and the surface conditions of the road. The displayed brake stopping distance varies by quickly responding to changes in the running speed of the vehicle and the surface conditions of the road. The brake stopping distance displaying apparatus comprises a vehicle speed detecting circuit for generating a signal corresponding to the running speed of the vehicle, a setting circuit for generating a signal corresponding to the friction coefficient of the road on which the vehicle runs, a computing circuit responsive to the two signals to generate a signal proportional to the square of the running speed and inversely proportional to the friction coefficient, and a display circuit for displaying the result of the computation in the computing circuit.

6 Claims, 7 Drawing Figures

METHOD AND APPARATUS FOR DISPLAYING BRAKE STOPPING DISTANCE OF A VEHICLE

BACKGROUND OF THE INVENTION

1. Field of the Invention

The invention relates to a distance displaying method and apparatus, and more particularly the invention relates to a brake stopping distance displaying method and apparatus for computing and displaying the distance needed to bring a running vehicle to a stop upon rapid braking of the vehicle.

2. Description of the Prior Art

With the running vehicles such as automobiles, accidents are frequently caused where, as for example, the following vehicle collides with the preceding vehicle from behind due to the failure of the following vehicle to maintain a proper following distance in relation to the preceding vehicle. Assuming that the proper following distance here means one which is greater than that needed to prevent collision of the vehicle upon rapid application of the brakes, it is necessary for the driver of the following vehicle to know the proper brake stopping distance of this vehicle. This distance varies considerably depending on the running speed of the vehicle, the road surface conditions, etc., and at present the determination of this distance is dependent on the various road signs, the driver's experience, etc. Consequently, where no road signs are available or the driver is inexperienced, it is difficult to surmise the proper brake stopping distance.

SUMMARY OF THE INVENTION

With a view to overcoming the foregoing difficulty, it is the object of this invention to provide a brake stopping distance displaying method and apparatus wherein the proper brake stopping distance of a vehicle is computed from the running speed of the vehicle and the friction coefficient of the road surface and the computed value is displayed for the driver. According to the method and apparatus of this invention, all what is required for the driver is to drive the vehicle in such a manner that the following distance is always maintained at a value which is greater than the displayed brake stopping distance and at the same time extremely safe driving is ensured.

DESCRIPTION OF THE PREFERRED EMBODIMENT

Figure 1:
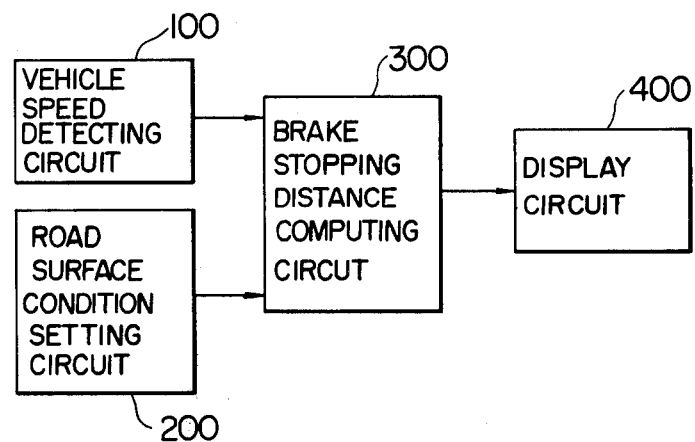
FIG. 1 is a block diagram showing an embodiment of a brake stopping distance displaying apparatus according to the invention.

The present invention will now be described in greater detail with reference to the illustrated embodiment. Referring to FIG. 1 showing the general construction of the apparatus according to the invention, numeral 100 designates a vehicle speed detecting circuit for generating pulses having a frequency proportional to the speed of a vehicle, 200 a road surface condition setting circuit for setting a friction coefficient corresponding to the surface conditions of a road in the form of a signal, 300 a computing circuit for computing a brake stopping distance from the output signals of the setting circuit 200 and the vehicle speed detecting circuit 100 to generate a signal corresponding to the computed value, 400 a display circuit responsive to the signal from the computing circuit 300 to display the computed value. Here, it is apparent that the computation in the computing circuit 300 may be expressed by the following equation:

$$X = V^2/(2 \mu g)$$

where
$X$ = brake stopping distance (m)
$V$ = vehicle speed (m/sec)
$\mu$ = friction coefficient of road surface
$g$ = acceleration of gravity (m/sec$^2$)

The detailed constructions of the above-mentioned circuits will now be described and in this embodiment the display circuit 400 is also capable of displaying the running speed of a vehicle. Further, in this embodiment the above-mentioned equation is approximated as $X = V_1^2/(200 \mu)$, where $V_1$ is the running speed (km/h) of a vehicle.

Figure 2:
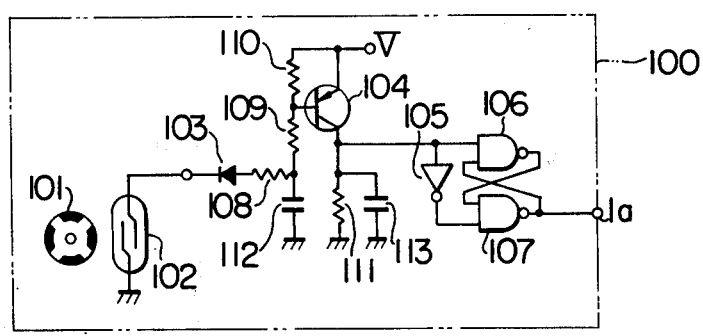
FIG. 2 is a wiring diagram of the vehicle speed detecting circuit used in the embodiment of FIG. 1.

In the vehicle speed detecting circuit 100 shown in FIG. 2, a reed switch 102 is positioned near a magnet 101 which is rotated by the speedometer cable of the vehicle that is not shown, so that the reed switch 102 is opened and closed repeatedly in response to the rotation of the magnet 101, thus generating pulses having a frequency proportional to the vehicle speed. To shape the waveform of these pulses, a waveform shaping section is provided which comprises a diode 103, a transistor 104, an inverter 105, an R-S flip-flop including NAND circuits 106 and 107, resistors 108, 109, 110 and 111 and capacitors 112 and 113. In this embodiment, the speedometer cable makes 637 revolutions per minute at a vehicle speed of 60 km/h and the reed switch 102 makes four on-off cycle of operations for every rotation of the magnet 101. Thus, when the vehicle speed is 60 km/h, 2548/60 Hz pulses are generated at a terminal 1a. In other words, when when the vehicle speed is $V_1$ km/h, 2548 $V_1$/3600 Hz pulses are generated.

Figure 3:
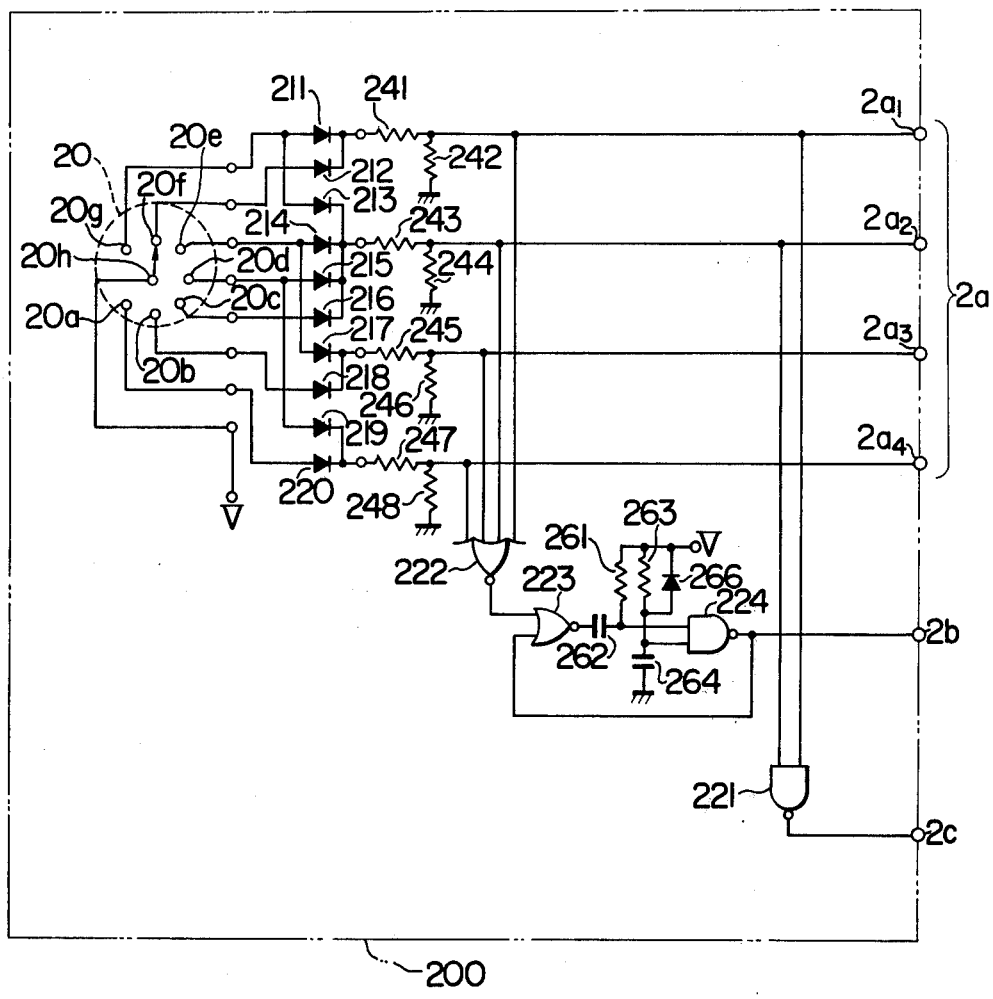
FIG. 3 is a wiring diagram of the road surface condition setting circuit used in the embodiment of FIG. 1.

In FIG. 3 showing the detailed construction of the setting circuit 200, a manually operated rotary switch 20 has its common terminal 20h connected to a power supply V and the other terminals 20a, 20b, 20c, 20d, 20e, 20f and 20g are arranged so that each of them generates a high level voltage (hereinafter simply referred to as a "1") when it is connected to the common terminal 20h. The rotary switch 20 is connected to a diode matrix comprising diodes 211 through 220 and the diode matrix is designed so that as the common terminal 20h is moved to each of the terminals 20a to 20g in this order, the binary coded signal generated at output terminals $2a_1$, $2a_2$, $2a_3$ and $2a_4$ (represented as [$2a_1$, $2a_2$, $2a_3$, $2a_4$])

changes from 0001 to 0010, 0100, 0101, 0110, 1000 and 1100. When converted to the equivalent decimal numbers, these binary coded signals represent respectively 1, 2, 4, 5, 6, 8 and 12. Each of these decimal numbers is ten times the corresponding friction coefficient $\mu$ of the road surface and any given one of the friction coefficients may be preset by the rotation of the rotary switch 20. Resistors 241 through 248 are connected between the output terminals $2a_1$ to $2a_4$ and the diode matrix to serve the dual purpose of changing the disconnected ones of the terminals $2a_1$ to $2a_4$ to "0" and protecting the elements against excessive voltages. In order that the vehicle speed may be computed and displayed when the common terminal 20h is connected to the terminal 20g, a NAND circuit 221 is connected to the terminals $2a_1$ and $2a_2$ so that it output goes to "0" only when the terminals $2a_1$ and $2a_2$ to to "1". In other words, a discrimination signal is generated so that the computation and display of brake stopping distance are effected when a terminal 2c goes to "1", whereas the computation and display of vehicle speed are effected when the terminal 2c goes to "0". In this case, when the common terminal 20h of the rotary switch 20 is switched from one terminal to another, there is a period during which the terminal 20h is connected to none of the terminals. To detect this period, a NOR circuit 222 is connected to the terminals $2a_1$ to $2a_4$ and this NOR circuit 222 is also connected to a monostable circuit comprising a NOR circuit 223, a NAND circuit 224, a resistor 261 and a capacitor 262, thus generating at a terminal 2b a "1" pulse having a time width of about 1 msec. On the other hand, a resistor 263, a capacitor 264 and a diode 266 are connected to the NAND circuit 224 so that a "1" pulse is generated at the terminal 2b by virtue of the fact that the voltage across the capacitor 264 is zero when the power supply V is connected.

Figure 4:
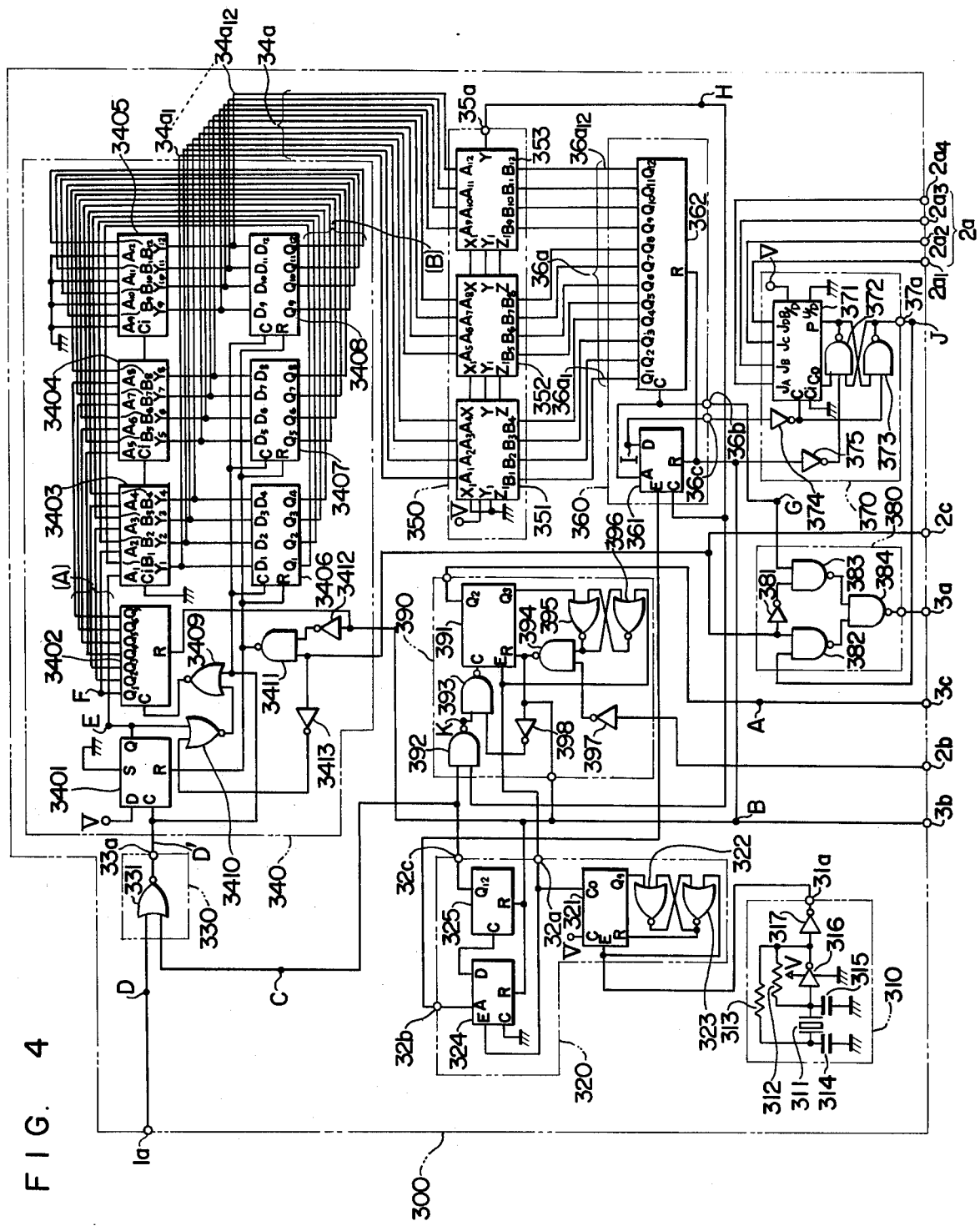
FIG. 4 is a wiring diagram of the computing circuit used in the embodiment of FIG. 1.
Figure 6:
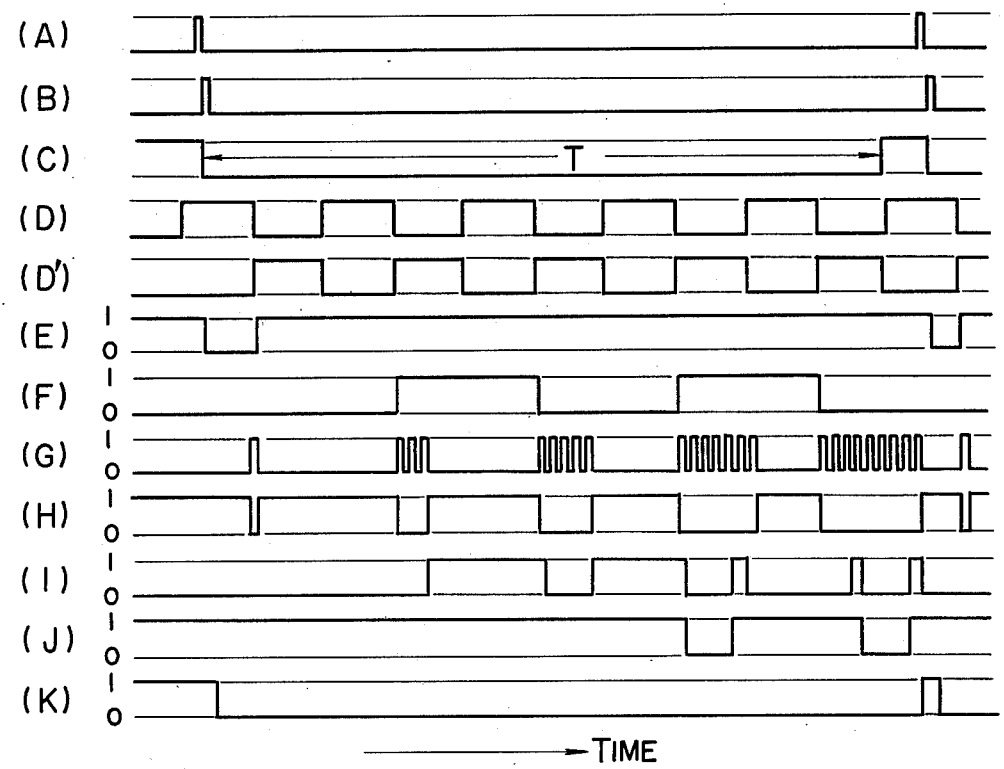
FIG. 6 is a signal waveform diagram useful for explaining the operation of the computing circuit shown in FIG. 4.
Figure 7:
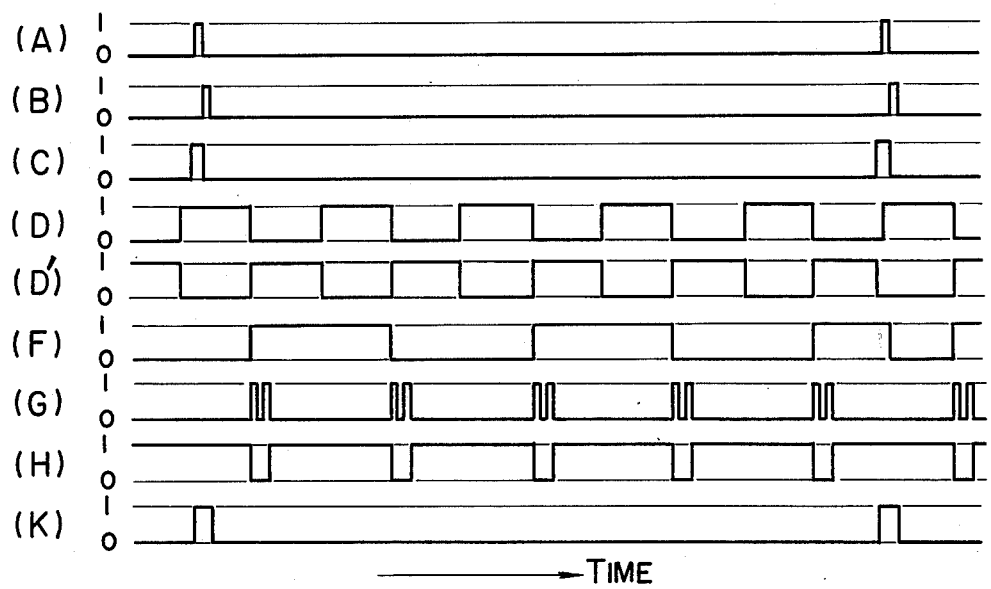
FIG. 7 is a signal waveform diagram useful for explaining the operation of the computing circuit for computing the speed of a vehicle.

As shown in FIG. 4, the computing circuit 300 comprises a reference oscillator circuit 310, a frequency divider circuit 320, a gate circuit 330, a square computing circuit 340, an equality detecting circuit 350, a counter circuit 360 with gate, a programmable frequency divider circuit 370, a selector circuit 380 and a control circuit 390. The waveforms generated at various points designated by alphabets on the lines in the Figure are shown in FIGS. 6 and 7, respectively. The reference oscillator circuit 310 comprises a crystal oscillator 311, resistors 312 and 313, capacitors 314 and 315 and inverters 316 and 317, thus generating at a terminal 31a a pulse signal whose frequency is 262,144 Hz. The frequency divider circuit 320 comprises a decade counter 321 (e.g., the RCA CD4017), an R-S flip-flop including NOR circuits 322 and 232, a decade counter 324 (e.g., the RCA CD4518) and a binary counter 325 (e.g., the RCA CD4020). Thus, when a reset terminal 3b goes to "1", the decade counter 324 and the binary counter 325 are reset thus causing all of terminals 32a, 32b and 32c to go to "0", whereas at the instant that the reset terminal 3b goes to "0" as shown in (B) of FIGS. 6 and 7 the frequency divider circuit 320 starts its frequency dividing action. In the present embodiment, a 262144/9 Hz pulse signal is generated at the terminal 32a and a 262144/18 Hz pulse signal is generated at the terminal 32b, while at the expiration of 45/64 seconds or about 0.703 seconds a "1" pulse is generated at the terminal 32c or line C as shown in (C) of FIGS. 6 and 7. The terminal 32c is connected to a NOR circuit 331 constituting the gate circuit 330 so that at the instant that the reset terminal 3b goes to "0" the gate is opened for about T = 0.703 seconds and the pulses generated at the terminal 1a of the vehicle speed detecting circuit 100 or line D as shown in (D) of FIGS. 6 and 7, are inverted and generated at a terminal 33a. Since the frequency of the output pulses of the vehicle speed detecting circuit 100 is 2548 $V_1$/3600 Hz when the speed is $V_1$ km/h as mentioned earlier, the number of the pulses generated at the terminal 33a is represented by 2548 $V_1$/3600 × 0.703 or $V_1$/2.

The square computing circuit 340 comprises a D-type flip-flop 3401 (e.g., the RCA CD4013), a binary counter 3402 (e.g., the RCA CD4040), adders 3403, 3404 and 3405 (e.g., the RCA CD4008), registers 3406, 3407 and 3408 (e.g., the RCA CD4035), NOR circuits 3409 and 3410, a NAND circuit 3411 and inverters 3412 and 3413.

Firstly, with the terminal 2c of the setting circuit 200 being at "1", the brake stopping distance computing operation of the circuit will now be described with reference to FIG. 6. When the reset terminal 3b is at "1", the output of the inverter 3412 goes to "0", the output of the NAND circuit 3411 goes to "1", and the D-type flip-flop 3401, the binary counter 3402 and the registers 3406, 3407 and 3408 are all reset thus changing their outputs to "0" and thereby causing terminals $34a_1$ to $34a_{12}$ to go to "0". Thereafter, when the reset terminal 3b goes to "0", the gate circuit 330 is opened, while the output of the inverter 3412 goes to "1" and the output of the NAND circuit 3411 goes to "0". Since output terminal Q of the D-type flip-flop 3401 is initially at "0" and the terminal 2c is at "1" so that the output of the inverter 3413 is at "0", the output of the NOR gate 3410 goes to "1" and the NOR gate 3409 is closed. When the pulse signals shown in (D') of FIG. 6 arrive at the terminal 33a in this condition, these signals are applied to the C terminal of the D-type flip-flop 3401 and the registers 3406, 3407 and 3408, respectively, but they are not applied to the C terminal of the binary counter 3402 since the NOR gate 3409 is closed. Consequently, the Q output terminal of the D-type flip-flop 3401 changes its state as shown in (E) of FIG. 6 in response to the rising edge of the first pulse signal at the terminal 33a, but the content of the binary counter 3402 remains 0 since the output of the NOR gate 3409 is at "0". While data are read into the registers 3406, 3407 and 3408 in response to the rising edges of the pulse signals from the terminal 33a, their output remains 0 since the content of the binary counter 3402 is 0. Then, as the Q terminal of the D-type flip-flop 3401 goes to "1" so that the NOR gate 3409 is opened, the output D' of the gate circuit 330 is applied to the binary counter 3402 through the NOR gate 3409 and the binary counter 3402 generates outputs $Q_1$ to $Q_7$ which are in turn combined with the output generated at the Q terminal of the D-type flip-flop 3402 thus producing a series of binary numbers. Assuming that the value of each of these binary numbers is represented as [A] and the contents of the registers 3406 to 3408 are represented as [B], immediately after the application of the first pulse signal, we obtain [A] = 1 and [B] = 0. On the other hand, the output of the adders 3403, 3404 and 3405 is [A] + [B] and thus the output becomes "1". Next, consider about that which happens in response to the the application of the second pulse signal to the binary counter 3402. In this case, since the Q output terminal of the D-type flip-flop 3401 has gone to "1", the output of the NOR circuit 3410 goes to "0" and the NOR gate 3409 is opened. Consequently, the $Q_1$ output of the binary counter 3402 goes to "1" as shown in (F) of FIG. 6. Since the output of the D-type flip-flop 3402 remains at "1", the value of the resulting binary number is now [A] = 3. The output of the registers 3406, 3407 and 3408 now becomes 1 and consequently the output at a terminal 34a (generically representing the lines 34a₁ to 34a₁₂) of the adders 3403, 3404 and 3405 now becomes 4. Similarly, the application of the Nth pulse signal from the gate circuit 330 results in [A] = 2N − 1 and $$[B] = \sum_{k=1}^{N-1} (2k - 1)$$

and thus the adder output 34a now becomes $$[A] + [B] = \sum_{k=1}^{N} (2k - 1).$$

It is known that this value is in arithmetic progression and the result represents N². Thus, the value generated at the terminal 34a represents a square of the number of the input pulses. Consequently, when the vehicle is running at a speed of $V_1$ km/h, then the result of the computation in the square computing circuit 340 is given as $V_1^2/4$ since it is a square of the $V_1/2$ input pulses.

Next, with the terminal 2c at "0", the vehicle speed computing operation of the square computing circuit 340 will be described with reference to FIG. 7. In this case, the output of the NAND circuit 3411 goes to "1" so that the the D-type flip-flop 3401 and the registers 3406, 3407 and 3408 are reset and their outputs all remain at "0". Also the output of the inverter 3413 goes to "1" with the result that the output of the NOR circuit 3410 goes to "0" and the NOR gate 3409 always remains open. Thus, when the pulse signal shown in (D') of FIG. 7 is applied to the terminal 33a, the contents of the binary counter 3402 is increased by one by its rising edge as shown in (F) of FIG. 7, but the outputs of the D-type flip-flop 3401 and the registers 3406, 3407 and 3408 remain at "0". When the Nth pulse signal is applied from the gate circuit 330, since the contents of the binary counter 3402 are N and the D-type flip-flop 3401 has been reset, the Q output of the D-type flip-flop 3401 goes to "0" and this "0" output is applied to the A₁ terminal of the adder 3403. This results in [A] = 2N and [B] = 0 and hence the adder output 34a becomes 2N. Thus, when the vehicle speed is $V_1$ km/h, then the result of the computation is $V_1$. However, this result is given only in even numbers.

The equality detecting circuit 350 comprises magnitude comparators 351, 352 and 353 (e.g., the RCA CD4063) and it compares an output 36a (generically representing lines 36a₁ to 36a₁₂) of the counter circuit 360 with gate comprising a decade counter 361 (e.g., the RCA CD4518) and a binary counter 362 (e.g., the RCA CD4040) and the output 34a of the square computing circuit 340, so that when the equality is detected between the outputs a "1" is generated at a terminal 35a as shown in (H) of FIGS. 6 and 7. This output signal is applied to the C terminal of a decade counter 361 in the counter circuit 360 with gate so that the C terminal goes to "1" and the decade counter 361 no longer counts the pulses applied to its E terminal from the frequency divider circuit 320. In other words, when the outputs of the square computing circuit 340 and the counter circuit 360 with gate are not equal to each other, the output 35a of the equality detecting circuit 350 goes to "0" and the counter circuit 360 with gate counts the pulses from the terminal 32b, whereas when the outputs 34a and 36a become equal to each other the terminal 35a goes to "1" and the operation of the decade counter 361 is stopped. In other words, the number of the pulses generated at a terminal 36b becomes equal to the result of the computation in the square computing circuit 340. The signals from the D terminal of the decade counter 361 are generated at a terminal 36c and as shown in (I) of FIG. 6 the number of these signals is 1/5 of the signals generated at the terminal 36b as shown in (G) of FIG. 6. Since the output of the square computing circuit 340 is $V_1^2/4$, the number of the output pulses at the terminal 36c is apparently given as $V_1^2/20$. It is also apparent that the number of the pulses generated at the terminal 36b during the vehicle speed computing operation corresponds to $V_1$ as shown in (G) of FIG. 7. On the other hand, when the reset terminal 3b goes to "1", the decade counter 361 and the binary counter 362 are reset and their outputs go to "0" altogether.

The programmable frequency divider circuit 370 comprises a presettable down counter 371 (e.g., the RCA CD4029), an R-S flip-flop including NAND circuits 372 and 373 and inverters 374 and 375, and the terminals 2a₁, 2a₂, 2a₃ and 2a₄ of the setting circuit 200 are respectively connected to jam terminals $J_A$, $J_B$, $J_C$ and $J_D$ of the presettable down counter 371. When the reset terminal 3b is at "1", the output of the inverter 375 goes to "0" and the output of the NAND circuit 372 goes to "1", thus presetting in the presettable down counter 371 the value of the friction coefficient preset by the setting circuit 200. Assuming now that the preset value is N, since the pulses generated at the terminal 36c are inverted by the inverter 374 and applied to the C terminal of the presettable down counter 371, the presettable down counter 371 counts down and the occurrence of N pulses at the terminal 36c causes its contents to become 0. When this occurs, the C₀ terminal of the presettable down counter 371 changes from "1" to "0" so that the output of the NAND circuit 372 goes to "1" and the output of the NAND circuit 373 goes to "0". Consequently, the value of N is again preset in the presettable down counter 371 and the output of the NAND circuit 373 changes from "0" to "1" in response to the rising edge of the next pulse generated at the terminal 36c. In this way, each time N pulses are applied to the terminal 36c, an output pulse is generated at a terminal 37a. When N = 2, the signals at the terminal 37a vary as shown in (J) of FIG. 6. Here, it is apparent that if the friction coefficient of the road surface is μ (0 to 0.8), then the setting circuit 200 presets the value of 10 μ and generates it at the terminal 2a as mentioned earlier and thus $V_1^2/200$ μ pulses appear at the terminal 37a when the vehicle is running at a speed of $V_1$ km/h.

The selector circuit 380 comprises an inverter 381 and NAND circuits 382, 383 and 384, so that when the terminal 2c is at "1", the pulses appearing at the terminal 37a are generated at a terminal 3a, whereas when the terminal 2c is at "0", the pulses appearing at the terminal 36b are generated at the terminal 3a. Since, as mentioned earlier, the signal generated at the terminal 2c is "1" when the brake stopping distance is to be computed and displayed, whereas the signal is "0" when the vehicle speed is to be computed and displayed, if the vehicle speed is $V_1$ km/h, $V_1^2$200 μ pulses are generated at the terminal 3a during the brake stopping distance computing and displaying operation, whereas $V_1$ pulses are generated at the terminal 3a during the vehicle speed computing and displaying operation.

The control circuit 390 comprises a decade counter 391 (e.g., the RCA CD4017), HAND circuits 392, 393 and 394, an R-S flip-flop including NOR circuits 395 and 396 and inverters 397 and 398. At the expiration of about 0.703 seconds after the transition of the reset terminal 3b from "1" to "0", the terminal 32c of the frequency divider circuit 320 changes from "0" to "1" and the gate circuit 330 is closed thus completing the computation in the square computing circuit 340. Then, when the terminal 35a of the equality detecting circuit 350 changes from "0" to "1", the output of the NAND circuit 392 goes to "0" and the output of the HAND circuit 393 goes to "1" as shown in (K) of FIGS. 6 and 7. This signal is applied to the C terminal of the decade counter 391 and the $Q_2$ and $Q_3$ terminals of the decade counter 391 are sequentially changed to "1" in synchronism with the rising edges of the signals from the terminal 32a connected to the E terminal. When the $Q_3$ terminal of the decade counter 391 goes to "1", the R-S flip-flop including the NOR circuits 395 and 396 changes its state and the output of the NOR circuit 395 goes to "0". Consequently, the output of the NAND circuit 394 goes to "1" and a "1" pulse is generated at the reset terminal 3b as shown in (B) of FIGS. 6 and 7. The R-S flip-flop changes its state again and returns to the initial state in response to the rising edge of the pulse applied to the E terminal and the terminal 3b again goes to "0". In general, the time of the switching of the rotary switch 20 in the setting circuit 200 is not synchronized with the computing cycle of the computing circuit 300 and consequently if the rotary switch 20 is switched in the course of the computation, namely, the friction coefficient $\mu$ is changed, an erroneous computation result is caused. Consequently, when the rotary switch 20 is switched, a "1" pulse having a time width of about 1 msec is applied to the control circuit 390 through the terminal 2b, so that this input pulse is inverted by the inverter 397 and a "1" level reset pulse is preferentially generated at the output of the NAND circuit 394, thus restoring the initial conditions even in the course of the computation and thereby preventing any erroneous display. The waveform shown in (A) of FIGS. 6 and 7 is the signal generated at a terminal 3c of the computing circuit 300 when there is no change in the setting of the friction coefficient $\mu$ and this signal is used for the memory and display operations of the display circuit 400.

Figure 5:
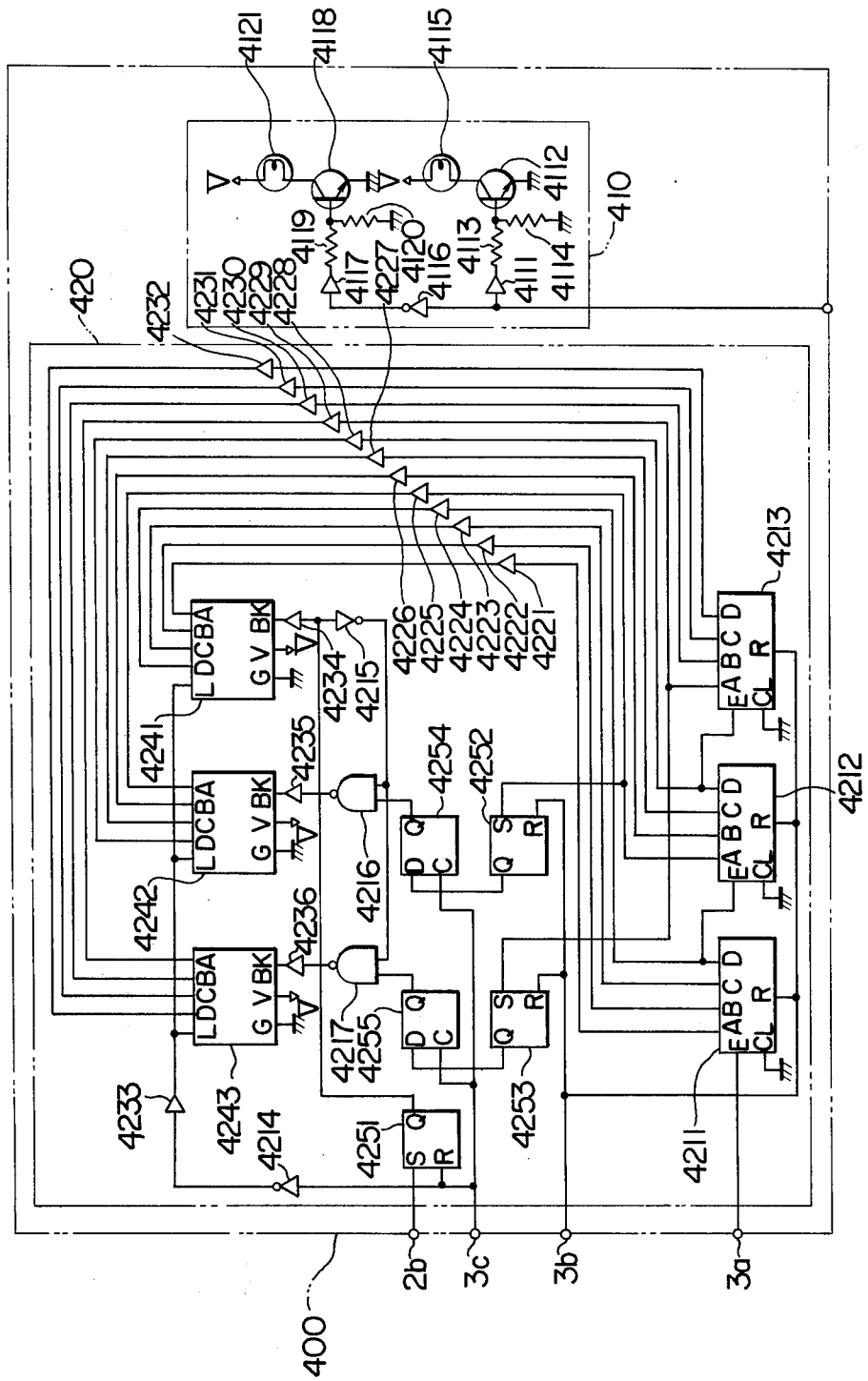
FIG. 5 is a wiring diagram of the display circuit used in the embodiment of FIG. 1.

In the display circuit 400 shown in FIG. 5, a unit display circuit 410 which discriminates whether the value to be displayed is the brake stopping distance or vehicle speed, is designed so that when the output terminal 2c of the setting circuit 200 is at "1", namely, when the brake stopping distance is to be displayed, an indicator lamp 4115 for indicating a display unit (m) is turned on through a buffer gate 4111 (e.g., the RCA CD4050) by a lamp driver including a transistor 4112 and resistors 4113 and 4114. On the other hand, when the terminal 2c is at "0", namely, when the vehicle speed is to be displayed, the output of an inverter 4116 goes to "1" and an indicator lamp 4121 for indicating a display unit (km/h) is turned on through a buffer gate 4117 (e.g., the RCA CD4050) by a lamp driver including a transistor 4118 and resistors 4119 and 4120. On the other hand, a numerical value display circuit 420 is designed so that the computation result computed and selected by the computing circuit 300 and appearing at the terminal 3a in the form of a pulse train, is counted by a counter section comprising decade counters 4211, 4212 and 4213 (e.g., the RCA CD4518) and the count value is applied through buffer gates 4221 to 4232 (e.g., the RCA CD4050) to digit displays 4241, 4242 and 4243 (e.g., the Yokogawa.Hewlette.Packard 5082-7340). When the computation is completed in the computing circuit 300, a "1" pulse appears at the terminal 3c and a latch pulse is applied through an inverter 4214 and a buffer gate 4233 to the L terminal of the digit displays 4231, 4242 and 4243, respectively, which in turn store and display the data supplied from the counter section. As mentioned previously, the numerical value to be displayed will be the value of $V_1^2/200\,\mu$ during brake stopping distance displaying operations, whereas the value of $V_1$ will be displayed during vehicle speed display operations. On the other hand, when the setting of the rotary switch 20 is changed, a "1" pulse is generated at the terminal 2b changing the Q terminal of an R-S flip-flop 4251 to "1", the output of an inverter 4215 to "0" and the outputs of NAND circuits 4216 and 4217 to "1", respectively, and the BK terminals of the digit displays 4241, 4242 and 4243 are changed to "1" through buffer gates 4234, 4235 and 4236. Since the BK terminal has the function of extinguishing the display when it goes to "1", all of the three digits of the decimal display are extinguished. With the display being extinguished, the computing circuit 300 performs a computation according to a newly preset value and at the instant that the computation is completed the Q terminal of the R-S flip-flop 4251 returns to "0" in response to a "1" pulse from the terminal 3c and a display is started again. In this case, the displayed value shows the result of the computation made according to the newly preset friction coefficient. R-S flip-flops 4252 and 4253, D-type latches 4254 and 4255 (e.g., the RCA CD4042) and NAND circuits 4216 and 4217 constitute a reading zero blanking section. The operation of this section immediately following the occurrence of a reset pulse at the terminal 3b is as follows. Assuming that the number of the pulses applied to the terminal 3a before the occurrence of the next latch pulse at the terminal 3c was 9 or less, the A terminals of the decade counters 4212 and 4213 remain at "0". Consequently, the Q terminals of the R-S flip-flops 4252 and 4253 also remain at "0" and these signals are coupled to the D terminals of the D-type latches 4254 and 4255. As a result, when the next latch pulse occurs at the terminal 3c, the Q terminals of the D-type latches 4254 and 4255 go to "0" so that the outputs of the NAND circuits 4216 and 4217 go to "1" and the BK terminals of the digit displays 4242 and 4243 are changed to "1" through the buffer gates 4235 and 4236 thus blanking the higher two digits. On the other hand, when the number of the pulses applied to the terminal 3a was between 10 to 99, the Q terminals of the R-S flip-flops 4252 and 4253 go to "1" and "0", respectively, and thus the Q terminals of the D-type latches 4254 and 4255 go to "1" and "0", respectively, in response to the next latch pulse from the terminal 3c. Consequently, the output of the NAND circuit 4216 goes to "0" and the output of the NAND circuit 4217 goes to "1". Thus, the BK terminal of the digit display 4242 goes to "0" and the BK terminal of the digit display 4243 goes to "1", thereby blanking only the hundreds digit. In this way, the display circuit 400 displays a numerical indication of the brake stopping distance thus enabling the driver to read the displayed value and utilize it as a guide for safe driving.

It should be appreciated that various modifications and changes may be made to the construction of the individual circuits used with the present invention and moreover the displays may be in the form of analog indications in place of digital indications. Further, it may be arranged so that a warning is given when the computed value reaches a dangerous point from safe driving point of view.

We claim:

1. A brake stopping distance displaying apparatus for a vehicle comprising:
   a vehicle speed detecting circuit for generating a signal corresponding to the running speed of a running vehicle;
   a setting circuit presettable as desired in response to the surface conditions of a road on which said vehicle is running for generating a signal corresponding to a preset friction coefficient of said road surface;
   a computing circuit connected to said vehicle speed detecting circuit and said setting circuit for generating from the signals therefrom a signal corresponding to a brake stopping distance which is proportional to the square of said running speed and inversely proportional to said friction coefficient; and
   a display circuit connected to said computing circuit for responding to the signal from said computing circuit to display a result of said computation of the brake stopping distance.

2. An apparatus according to claim 1 further comprising a selector circuit connected between said computing circuit and said display circuit for selecting either one of said signals corresponding to the running speed and said signal corresponding to the brake stopping distance, whereby the running speed and the brake stopping distance are alternately displayed through said display circuit.

3. An apparatus according to claim 1, wherein said vehicle speed detecting circuit includes a magnet rotatable in proportion to the running speed of said vehicle, and a reed switch disposed near said magnet.

4. An apparatus according to claim 1, wherein said setting circuit includes:
   a rotary switch having a rotary shaft rotatable in response to said friction coefficient; and
   a diode matrix connected to said rotary switch for generating a binary coded signal corresponding to said friction coefficient.

5. An apparatus according to claim 1, wherein said computing circuit includes:
   a clock pulse generator circuit for generating reference clock pulses;
   a frequency divider circuit connected to said clock pulse generator circuit for dividing the frequency of said clock pulses;
   a gate circuit connected to said frequency divider circuit and said vehicle speed detecting circuit for passing and said signal corresponding to the running speed for a predetermined time;
   a square computing circuit connected to said gate circuit for generating from said vehicle speed signal passed therethrough a square signal proportional to the square of the vehicle speed;
   a counter circuit with gate connected to said square computing circuit and said frequency divider circuit for counting pulses proportional in number to said square signal; and
   a programmable frequency divider circuit connected to said setting circuit and said counter circuit with gate for generating said brake stopping distance signal in response to said signal corresponding to the friction coefficient of the road surface and the pulses from said counter circuit with gate.

6. A method of displaying a brake stopping distance of a vehicle comprising the steps of:
   detecting the running speed of a vehicle to generate a pulse signal having a frequency proportional to said running speed;
   accomplishing a multiplication by performing an addition each time said pulse signal is generated during a predetermined period of time to generate pulse signals proportional in number to the square of said running speed;
   presetting a friction coefficient corresponding to a road surface on which said vehicle is running in the form of a binary code;
   accomplishing a division by counting the pulse signals generated by said multiplication to generate pulse signals which are, in number, proportional to the square of said running speed and inversely proportional to said friction coefficient each time the count value of said pulse signals reaches the value determined by said presetting; and
   counting the pulse signals generated by said division and displaying a brake stopping distance in digital form.

* * * * *